United States Patent
Murrow et al.

(10) Patent No.: US 11,149,900 B2
(45) Date of Patent: Oct. 19, 2021

(54) TRIPOD LEG SPREADER

(71) Applicant: The Vitec Group PLC, Richmond (GB)

(72) Inventors: Andrew Derek Murrow, Bury St. Edmunds (GB); Jolyon Torbitt, Bury St. Edmunds (GB); Simon Hall, Stowmarket (GB); James Guest, Bury St. Edmunds (GB)

(73) Assignee: The Vitec Group Plc., Richmond (GB)

( * ) Notice: Subject to any disclaimer, the term of this patent is extended or adjusted under 35 U.S.C. 154(b) by 0 days.

(21) Appl. No.: 17/261,510

(22) PCT Filed: Jul. 18, 2019

(86) PCT No.: PCT/GB2019/052007
§ 371 (c)(1),
(2) Date: Jan. 19, 2021

(87) PCT Pub. No.: WO2020/016585
PCT Pub. Date: Jan. 23, 2020

(65) Prior Publication Data
US 2021/0247021 A1 Aug. 12, 2021

(30) Foreign Application Priority Data
Jul. 18, 2018 (GB) ........................ 1811750

(51) Int. Cl.
*F16M 11/24* (2006.01)
*F16M 11/34* (2006.01)

(52) U.S. Cl.
CPC .......... *F16M 11/245* (2013.01); *F16M 11/34* (2013.01); *F16M 2200/028* (2013.01); *F16M 2200/08* (2013.01)

(58) Field of Classification Search
CPC ................ F16M 11/34; F16M 11/245; F16M 2200/028; F16M 2200/08
See application file for complete search history.

(56) References Cited

FOREIGN PATENT DOCUMENTS

| GB | 2549171 A | 10/2017 |
|---|---|---|
| WO | WO 03/008855 A1 | 1/2003 |
| WO | WO 2018/047207 A1 | 3/2018 |

*Primary Examiner* — Bradley Duckworth
(74) *Attorney, Agent, or Firm* — Troutman Pepper Hamilton Sanders LLP

(57) ABSTRACT

A leg spreader (10) for a tripod comprising at least two portions (12, 14) selectably moveable with respect to one another along an axis; a first portion comprising a latch (16) and a second portion comprising an engagement region (18); the latch being releasably engageable with the engagement region, the latch being moveable by an actuator (20) between an engaged position in which the portions are substantially non-moveable with respect of one another and a disengaged position in which the portions are moveable with respect to one another; wherein the latch is biased towards the engaged position.

20 Claims, 11 Drawing Sheets

TRIPOD LEG SPREADER

CROSS REFERENCE TO RELATED APPLICATIONS

This application is a national phase filing under 35 U.S.C. § 371 of International Patent Application No. PCT/GB2019/052007, filed Jul. 18, 2019, which claims priority to Great Britain Application No. 1811750.7 filed Jul. 18, 2018 which is incorporated herein by reference in its entirety.

FIELD OF THE INVENTION

The invention relates to leg spreaders for tripods and more specifically to floor type leg spreaders for tripods.

BACKGROUND TO THE INVENTION

Tripods and similar support frames are widely used as platforms for supporting camera equipment and maintaining the stability of camera equipment during use. When supporting heavy equipment, it is important that the structural integrity of a tripod is maintained so that the position of the equipment is not compromised and so that the risk of damage to the equipment or injury to the user from the tripod collapsing is minimised.

It is important that the stability of the tripod is maintained particularly for work requiring the camera equipment to be at a relatively low height. Therefore, tripods often comprise a supporting cross-member, known as a leg spreader, to prevent the legs of the tripod from moving further apart than required and maintaining the strength of the tripod. A leg spreader connects each of the tripod legs together.

Known leg spreaders incorporate an extendible arm which is housed within and extendible from a housing of the leg spreader. The leg spreader is typically arranged between a central hub connected to other leg spreaders and a leg of a tripod. Each leg spreader of a tripod is increased or reduced in length to match the erection or collapse of the tripod.

The term leg spreader is used throughout this description to describe an arm spanning, usually, from a foot of a tripod to a point at a substantially central and vertical axis of an erected tripod. Typically, a tripod comprises three leg spreaders which are connected to each other by a central hub which allows movement of each leg spreader in relation to the other leg spreaders. Other types of support equipment may comprise a fewer or greater number of leg spreaders.

Generally, there are two types of known leg spreaders: leg spreaders which are mounted halfway down the height of a tripod, often called mid-level spreaders; and ground/floor-level spreaders which are attached at or towards the feet of the tripod. It is common practice to place weights on a floor-level spreader to make the tripod more stable and similarly to hang weights from a mid-level spreader.

The present invention relates particularly to floor-level spreaders.

The extendible mechanisms of known leg spreaders require a user to loosen and tighten length adjustment means, usually by a screwing or twisting motion, which is time consuming, awkward and must be done by hand. This is particularly arduous given that the user is likely having to adjust each individual tripod leg at the same time to bring it to a required position.

WO 2018/047207 of Cartoni discloses a leg spreader which can be extended and retracted, in which extension requires special activation but does not oppose a force causing the spreader to retract.

It is an object of the present invention to provide an improved leg spreader.

SUMMARY OF THE INVENTION

The present inventive concept is directed to a leg spreader for a tripod comprising at least two portions selectably moveable with respect to one another along an axis; a first portion comprising a latch and a second portion comprising an engagement region; the latch being releasably engageable with the engagement region, the latch being moveable by an actuator between an engaged position in which the portions are substantially non-moveable with respect of one another and a disengaged position in which the portions are moveable with respect to one another; wherein the latch is biased towards the engaged position.

This configuration provides a leg spreader which can be straightforwardly actuated to increase and decrease its length. For example, the actuator may be operated by a user pressing on it with his or her foot. This may enable the user to adjust the height of a tripod simultaneously as they can adjust the length of the leg spreader with their foot whilst adjusting the length of the corresponding leg with their hands. This in contrast to known tripods and leg spreaders in which movement of leg spreader parts often requires both of the user's hands.

The actuator must disengage the latch from the engagement region to move the two portions to extend or retract—i.e. increase or decrease the length of the leg spreader.

The present inventive concept provides a greater ease of use because the actuator biases the latch towards the engaged position. The actuator has an engaged state in which the latch is disengaged and a disengaged state in which the latch is engaged. Thus, user action is only required to disengage the latch. The latch allows positional fixing of the at least two portions along the axis. In other words, the length of the leg spreader can be adjusted and fixed, making it shorter or longer in accordance with the user's needs.

The latch may comprise an abutment portion having an abutment surface. The engagement region may comprise an abutment surface. The respective abutment surfaces of the latch and engagement region preferably correspond with one another so that the abutment surface of the latch contacts an abutment surface of the engagement region when the latch is in the engaged position.

The abutment surfaces of the latch and engagement region provide an engagement between the latch and engagement region to prevent the movement of the first and second portions in relation to one another when the latch is in the engaged position. The engagement may be a frictional or geometric engagement.

The engagement region may comprise a series of abutment portions each having at least one abutment surface. The abutment portions may be spaced apart from one another and arranged substantially parallel to the axis of the leg spreader. A series of discrete abutment portions of the engagement region provides a series of possible lengths of leg spreader which may be selected by a user.

This configuration also provides clear points of adjustment for the leg spreader so that accurate relative positioning of legs of a tripod can be achieved. For example, three leg spreaders can each be adjusted to the same length to provide a substantially even tripod position.

The engagement region may comprise a series of crenelations with spaces therebetween, wherein each crenelation has at least two abutment surfaces. A crenelated configuration may provide a number of abutment surfaces for the corresponding abutment surface of the latch to abut and thereby fix the position of the first and second portions in relation to one another.

Preferably the abutment portion of the latch may have an axial length less than or equal to an axial length of the space between adjacent crenelations of the engagement region. Preferably, the abutment portion of the latch is substantially equal to the axial length of the spaces between crenelations. Thus, when the latch is in the engaged position, axial movement of the two leg spreader portions is minimised.

Preferably the abutment portion of the latch and the space between adjacent crenelations of the engagement region are correspondingly shaped so that the abutment surfaces thereof match when latch is in the engaged position. Thus, the abutment portion of the latch may substantially fill the space between crenelations so that movement of the first and second portions is minimised or avoided altogether when the latch is in the engaged position.

Alternatively, the engagement region may comprise a high friction surface. Yet alternatively the engagement region may comprise one or more apertures formed in the respective portion and the latch may comprise a bolt.

The actuator may be adapted to be actuated by a pressing force. Thus, the actuator may be actuated by a user pressing down on the actuator, thus disengaging the latch to allow adjustment of the length of the leg spreader. Such a pressing force may be provided, for example, by the hand or foot of a user.

The actuator may comprise a button pivotally mounted to the first portion of the leg spreader and moveable between an initial position and a final position.

The actuator may further comprise a cable which links the button and the latch, and a spring to bias the latch towards the engaged position. Thus, when the button is in the initial position, the latch is in the engaged position; when the button is moved towards the final position (for example by pressing), the cable causes the latch to be moved to the disengaged position. If the button is released the spring acts to move the latch to the engaged position and returns the button to the initial position.

This configuration provides an efficient and reliable means for disengaging the latch against the biasing means, such as a spring.

The cable is preferably metal. Alternatively, the cable may comprise a non-metallic material such as cotton or synthetic fibre.

Other alternative cable or spring-based mechanisms are envisaged. For example, the actuator may comprise a spring which links the button and the latch.

It is also envisaged that the actuator may be at least partially electronic and may be wired or wireless. For example, the button may be electronic and may comprise a transmitter which transmits a signal to a receiver connected to the latch when it is actuated. A processor may trigger disengagement of the latch when the signal is received.

An actuator may actuate the latch of more than one leg spreader so that all leg spreaders on a tripod can be adjusted simultaneously.

The button may be located at any position on the leg spreader which allows actuation by the user, preferably operable by the user's foot.

The button may comprise a joint attached to the cable and which abuts an inner surface of the first portion of the leg spreader, wherein a portion of the joint moves along the inner surface of the first portion, in use, to actuate movement of the cable and thus in turn the latch. Such a joint may convert a movement of the button when pressed—a pivoting movement—into an axial movement of the cable, for example via an intermediate link. The configuration minimises the number of components required to adjust the length of the leg spreader because the joint straightforwardly and reliably slides across the inner surface of the first portion, when the button is pressed down, to pull the cable against the impetus of the spring to disengage the latch. When the actuator is released, i.e. a user releases a pressing force, the latch engages the engagement region under the bias of the spring.

Alternatively, the actuator may comprise an internal bar, moved by the button, to actuate movement of the latch.

The button may be located towards an end of the leg spreader.

The actuator may alternatively comprise a pull-type mechanism.

The region of the inner surface of the first portion which is abutted by the joint may comprise a lubricant. A lubricant improves the reliability of the actuator. Alternatively, a lubricant may not be present. Low friction materials may be selected for the joint and/or the inner surface of the first portion to improve the reliability of joint operation.

The spring may be positioned between two keepers and the spring substantially envelopes a region of the actuator cable. Positioning the spring between two keepers retains the spring so that it biases the latch to the engaged position. Enveloping a region of the actuator cable with the spring minimises the risk that the spring moves out of its correct location and minimises the size and complexity of the apparatus. The spring may be located elsewhere on the leg spreader to urge the latch towards the engaged position and achieve the same overall effect.

The first portion may comprise a guide element and the cable and/or spring may be at least partially located within the guide element.

The spring is preferably located towards an end of the cable proximal to the latch.

The first portion may comprise an extendible arm and the second portion may comprise a housing in which the extendible arm is at least partially housed. Housing the first portion within the second portion reduces the overall size and complexity of the apparatus and allows the latch, engagement region and actuator to be safely held within the leg spreader. Alternatively, the first and second portions may be located adjacent and parallel to one another but not one housed within the other.

The first portion may comprise at least two parts and wherein the latch and actuator are positioned on an inner surface of one part only. A first portion comprising more than one part and providing the latch and actuator on only one of those parts allows the leg spreader to be more straightforwardly opened for maintenance or repair. It also provides more straightforward manufacture and assembly. Alternatively, the second portion may be unitary which may be stiffer and easier to make via some manufacturing processes.

The first and second portions of the leg spreader may be formed from a composite material such as a structured glass-filled plastic. The leg spreader may be manufactured at least partially via an injection moulding process and subsequently machine finished.

The leg spreader may be a floor type leg spreader. Being a floor type leg spreader allows a user to use their foot to actuate movement of the spreader so that the height and foot print of the tripod can be adjusted simultaneously. The leg spreader may be retrofitted to existing tripods.

The present inventive concept is also directed to a release mechanism for a foot, the mechanism comprising a release bar and a corresponding clasp for engaging the release bar; the clasp having a channel and at least one closing member moveable between an open position and a closed position; wherein the clasp comprises means for biasing the closing member towards the closed position, so that when the closing member is in the closed position the channel substantially encloses a portion of the release bar.

The present inventive concept also provides a foot suitable for a tripod having a base portion and a handle, wherein the foot is adapted to be attachable to a tripod leg and further comprises at least one component of a release mechanism adapted to releasably connect the foot to a portion of a leg spreader.

A suitable release mechanism preferably comprises components of a release bar and a corresponding clasp for engaging the release bar; the clasp having a channel and at least one closing member moveable between an open position and a closed position; wherein the clasp comprises means for biasing the closing member towards the closed position, so that when the closing member is in the closed position the channel substantially encloses a portion of the release bar.

The release bar may be arranged on a foot and the clasp may be arranged on a leg spreader. Thus, the foot may comprise at least one release bar suitable for engagement by a corresponding clasp, wherein the release bar and clasp form a release mechanism. Alternatively the release bar may be arranged on a leg spreader and the clasp may be arranged on a foot.

The present inventive concept is also directed to a foot comprising at least one release bar suitable for engagement by a corresponding clasp, wherein the release bar and clasp form a release mechanism.

The present inventive concept is also directed to a foot comprising at least one clasp suitable for engaging a corresponding release bar, wherein the clasp and release bar form a release mechanism.

A leg spreader may be provided with a corresponding clasp or release bar for attachment to a foot. A tripod leg may be provided with a securing recess adapted to receive part of a handle of a foot.

The foot may further comprise a handle being pivotally attached to the base portion at a first end and including a gripping portion at a second end, said handle further comprising a centrally deployed securing member attached to the gripping portion, the handle being movable between a first position in which the foot is removable from a leg and a second position in which an end of the securing member is secured within a securing recess in the leg whereby the foot is secured to the leg, Preferably, the handle comprises a substantially U-shaped portion and a handle bar portion connected between two points of the U-shaped portion. The handle bar portion may be arranged to pass through at least one opening formed in the base portion. Thus, the leg attachment portion may be attached to the base portion and rotatable relative to it. The handle bar portion may be a separate portion, attachable to the U-shaped portion to openings formed within the U-shaped portion adapted to receive the handle bar portion.

The handle is preferably somewhat elastic. Thus, the handle may be adapted to be elongated under a force so that the securing member may be positioned within the securing recess of a tripod leg. Once such a force is released, the U-shaped portion will ideally be attached to the receiving portion of the tripod leg. This arrangement is sometimes referred to as an over-centre mechanism.

The present inventive concept is also directed to a leg spreader comprising at least one release bar suitable for engagement by a corresponding clasp, wherein the release bar and clasp form a release mechanism.

The present inventive concept is also directed to a leg spreader comprising at least one clasp suitable for engaging a corresponding release bar, wherein the clasp and release bar form a release mechanism.

The present inventive concept is also directed to a leg spreader comprising a foot, wherein the foot is releasably attached to the leg spreader by a release mechanism.

This configuration allows a foot to be easily attached or removed from a leg spreader without disturbing the positioning of equipment, such as a camera, attached to the tripod. The tripod does not need to be lifted off the ground for a foot to be attached or removed.

The clasp may be connected to a portion of a tripod leg spreader, wherein the clasp comprises a substantially U-shaped channel for receiving a release bar connected to a foot, and a substantially planar closing member which is biased to close the channel. This configuration provides an intuitive and easy to use means for locating and retaining the release bar in the clasp.

The opening of the U-shaped channel may face upwards, in use, and the closing member may be located towards the top of the channel. This configuration allows a foot to be straightforwardly detached from the leg spreader without disturbing the rest of the tripod and positioning of equipment held by the tripod.

The present inventive concept is also directed to an assembly comprising a hub and a plurality of leg spreaders engaged with the hub substantially at an end of the respective leg spreader; each leg spreader having a button located closer to the hub engaging end of the respective leg spreader than to its other end. The button of each leg spreader may thus be engaged by a user by reaching with their foot from substantially a single position, keeping their other foot positioned on the ground, for example.

The button of each leg spreader may be located within approximately 0.5 m of the hub. This configuration aims to place each button within a distance approximately within the stride or step of a user. Thus, the user ought not to need to change his or her stance in order to engage the buttons of the assembly.

The button of each leg spreader may be at a substantially fixed distance from the hub. Thus, when portions of the leg spreader are moveable with respect to one another along an axis, i.e. the leg spreader is extended and retracted, the button does not move with respect to the hub.

BRIEF DESCRIPTION OF THE DRAWINGS

Exemplary embodiments of the present inventive concept will now be described with reference to the accompanying drawings in which.

DETAILED DESCRIPTION OF THE EMBODIMENTS

Figure 1:
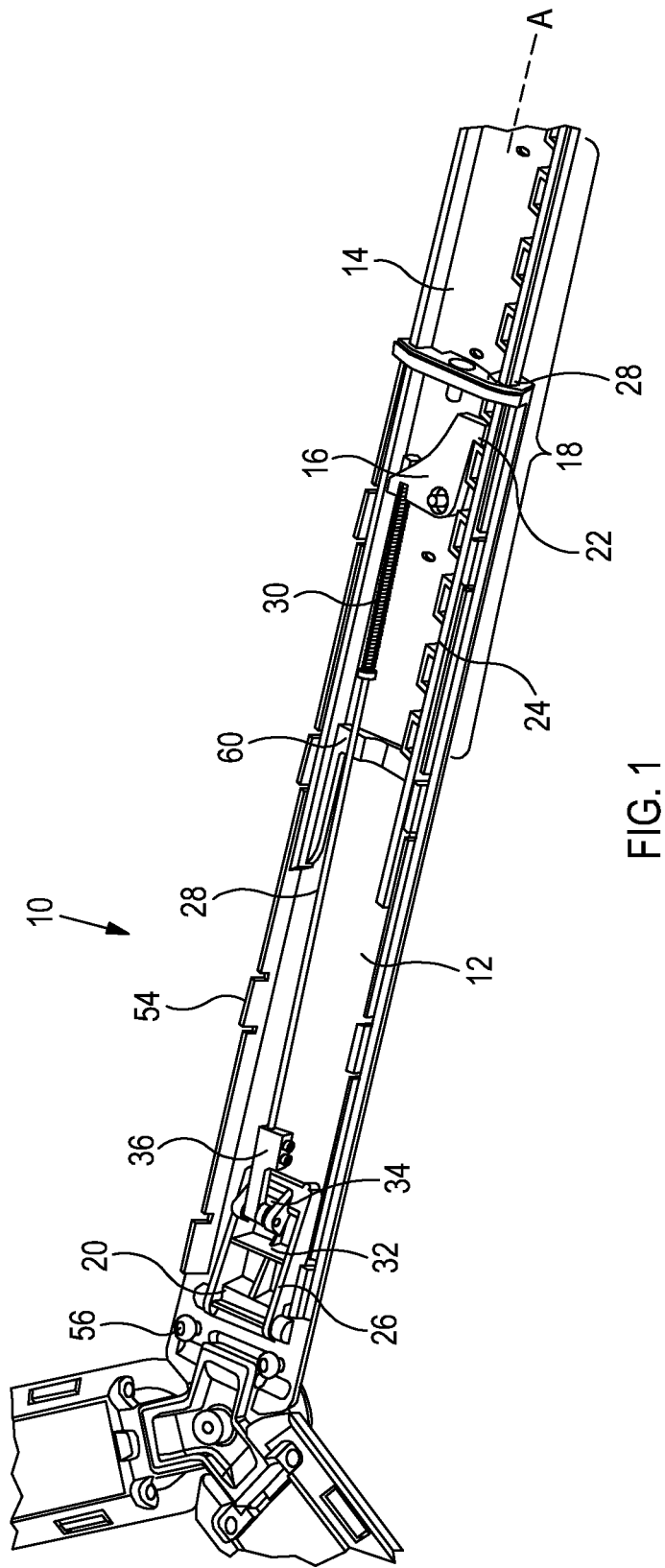
FIG. 1 shows a cutaway representation in perspective from below of a leg spreader of the present inventive concept in an engaged state.

Turning to FIG. 1, a leg spreader referenced generally as 10 comprises a first portion 12 and a second portion 14 which are selectably moveable with respect to one another along an axis (shown by dashed line A). The first portion comprises a latch 16 and the second portion comprises an engagement region 18. The latch 16 is releasably engageable with the engagement region 18. The latch 16 is moveable by an actuator 20 between an engaged position in which the portions are substantially non-moveable with respect of one another, and a disengaged position in which the portions are moveable with respect to one another, so that the length of the leg spreader 10 can be adjusted.

The latch 16 is biased towards the engaged position, where the first and second portions are non-moveable with respect to one another.

The latch 16 comprises an abutment portion 22 having an abutment surface and the engagement region 18 comprises a series of crenelations, such as 24, with spaces therebetween, the spaces corresponding lengthwise to the abutment portion 22 of the latch 16. The crenelations are spaced apart from one another along at least part of the length of the second portion 14. The series of crenelations of the engagement region 18 is arranged substantially parallel to the axis of the leg spreader 10. When the abutment surface of the abutment portion 22 of the latch 16 abuts an abutment surface of one of the crenelations of the engagement region 16, the first 12 and second 14 portions of the leg spreader are non-moveable in relation to one another. Because the latch 16 is biased towards the engaged position, the abutment portion 22 of the latch 16 abuts a corresponding abutment surface of the engagement region 18 when the actuator 20 is not in use.

Each raised crenelation of the engagement region 18 has a substantially trapezoidal cross-section.

The abutment portion 22 of the latch 16 has an axial length less than or equal to an axial length of the space between adjacent crenelations of the engagement region 18. The abutment portion of the latch 16 has a shape and size which is small enough for the latch 16 to enter a space between adjacent crenelations of the engagement region 18 but sufficiently large to minimise movement when the first and second portions of the leg spreader 10 are in the non-moveable position, i.e. when the latch is in the engaged position.

The abutment portion 22 of the latch 16 and the spaces between adjacent crenelations of the engagement region 18 are correspondingly shaped so that the abutment surfaces thereof match when the latch 16 is in the engaged position. More specifically, an abutment surface of each raised crenelation which engages the abutment surface of the latch 16, and the abutment surface of the abutment portion 22 of the latch 16 have corresponding surfaces which are substantially parallel with each other and which are inclined in relation to the axis.

The actuator 20 comprises a press-type mechanism. In other words, the actuator 20 is adapted to be actuated by a pressing force. The actuator 20 comprises a button 26 which is pivotally mounted to the first portion 12 and which is moveable between an initial position where the latch is in the engaged position, and a final position where the latch is in the disengaged position. The actuator 20 further comprises a cable 28 which links the button 26 and the latch 16.

A spring 30 biases the latch 16 towards the engaged position.

The button 26 comprises a joint which is attached to the cable and which abuts an inner surface of the first portion 12 to actuate movement of the cable 28 and thus the latch 16 which is pulled by the cable 28. The button 26 incorporates a pressing plate 32 (also shown in FIG. 6 and FIG. 7), the joint having an intermediate link member 34 and a cable securing member 36. The pressing plate 32 and intermediate link member 34 are hingedly joined to each other and the intermediate link member 34 and cable securing member 36 are also hingedly joined to each other. The cable securing member 36 is secured to the cable 38 by two pins.

In use, when the pressing plate 32 of the button 26 is pushed by a user, the joint formed by the intermediate link member 34 and cable securing member 36 effects pulling of the cable 28 to disengage the latch 16 from the engagement region 18 of the second portion 14 against the action of the spring 30. The button 26 is pushed in a substantially downward direction so that the button 26 pivots about the first portion 12. Pivoting of the button 26 causes the cable 28 to be pulled towards the joint which in turn pulls the latch from the engaged position to the disengaged position. When the latch 16 is in the disengaged position, the actuator 20 is in the final position.

The region of the inner surface of the first portion 12 which is abutted by part of the joint 36 such as an end of the intermediate link member 34, is coated with a lubricant so that the part of the joint 36 slidably moves along the inner surface of the first portion 12.

The spring 30 biases the latch 16 towards the engaged position and is positioned between two keepers 38, 40. The spring 30 substantially envelopes a region of the cable 28 proximal to the latch 16. The latch 16 moves about a pivot 42 and is attached to the cable 28 at an end substantially opposite from the abutment portion 22 of the latch 16.

The leg spreader 10 further comprises a guide element and the cable 28 is partially located within the guide element.

The first portion 12 of the leg spreader 10 comprises an extendible arm and the second portion 14 comprises a housing in which the first portion 12 is at least partially housed and can move along the axis of the leg spreader 10 when the latch 16 is in the disengaged position. The second portion 14 is comprised of two parts which are attached to one another to encase and protect the latch 16 and part of the actuator 20. The two parts of the second portion 14 are secured by a number of clips and/or screws, such as clip 54 and screw 56. The clips locate in corresponding apertures on the other part of the second portion 14. The two parts of the second portion 14 are substantially hollow and concave to provide a cavity in which the first portion 12 can be housed and move within when the latch 16 is in the disengaged position. The concave parts of the second portion 14 extend away from one another. The latch 16 and actuator 20 are positioned on an inner surface of one part of the first portion 12.

The first portion 12 comprises a head 64 at a substantially opposite end of the leg spreader 10 from the button 32. The head 64 comprises means for attachment to a foot.

The latch 16 and actuator 20 are positioned on one part of the second portion 14. The other part of the second portion 14 comprises an aperture for receiving the button 26 and allowing a user to press the pressing plate 32 of the button 26 downwards, into the leg spreader 10 to disengage the latch 16 and allow movement of the first 12 and second 14 portions with respect to one another along the axis.

The first portion 12 is located in an aperture 58 at an end of the second portion 14. A pair of shoulder elements 60 (one of which is not shown) prevents the first and second portions from being separated.

Figure 2:
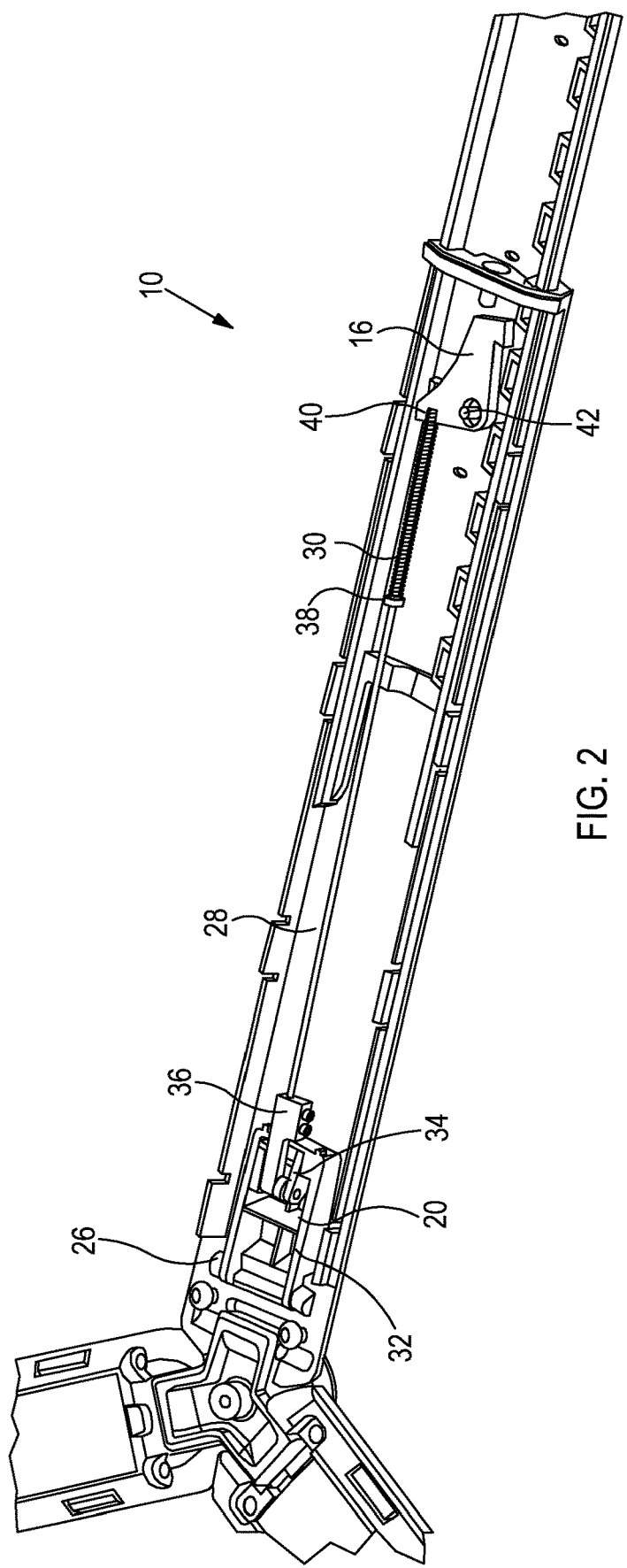
FIG. 2 shows the leg spreader of FIG. 1 in a disengaged state.

Referring to FIG. 2, the actuator 20 is in the final position and thus the cable 28 has been pulled back by the button 26, against the action of the spring 30, to disengage the latch 16 from the engagement region 18 of the second portion 14.

An end of the intermediate link member 34 abuts an inner surface of the first portion 12 and has moved along the inner surface of the first portion 12 after being pressed down via the pressing plate 32 to actuate movement of the latch 16. The inner surface of the first portion 12 is a surface which is internal when the leg spreader 10 is in use.

When the latch 16 is in the disengaged position of FIG. 2, the first 12 and second 14 portions are moveable with respect to one another. In other words, the length of the leg spreader 10 may be adjusted when the latch is disengaged 16. The first and second portions may be pushed together or pulled apart to adjust the length of the leg spreader 10 before the actuator 20 is disengaged by the user to move the latch 16 to the engaged position.

When the actuator 20 is disengaged by the user the latch 16 fixes the positioning of the first 12 and second 14 portions with respect to one another once again.

Figure 3:
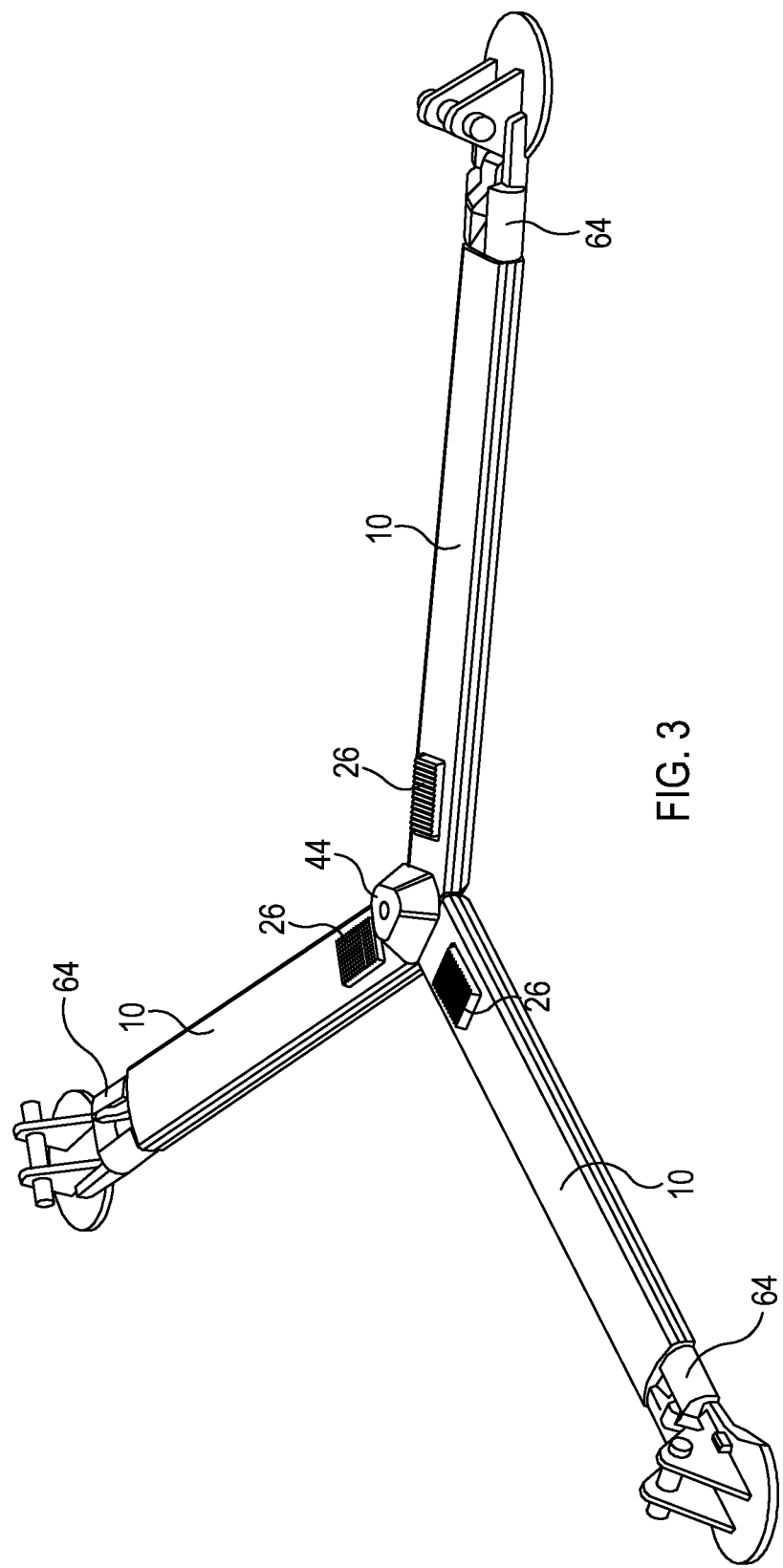
FIG. 3 shows a perspective view of three leg spreaders of the present inventive concept in a retracted state.

Referring to FIG. 3, shows three floor-type leg spreaders 10, connected by a hub 44, which are each adjustable in the manner described above. The hub 44 facilitates independent movement of each leg spreader with respect to the other two leg spreaders. The button 26 of each leg spreader is actuable by the hand or foot of a user so that as a tripod is adjusted in height, and the tripod feet and legs consequently move away from each other, the leg spreaders are able to move simultaneously. FIG. 3 shows the leg spreaders in a fully or near fully retracted state. Each leg spreader comprises a head 64 which is attached to a foot.

Figure 4:
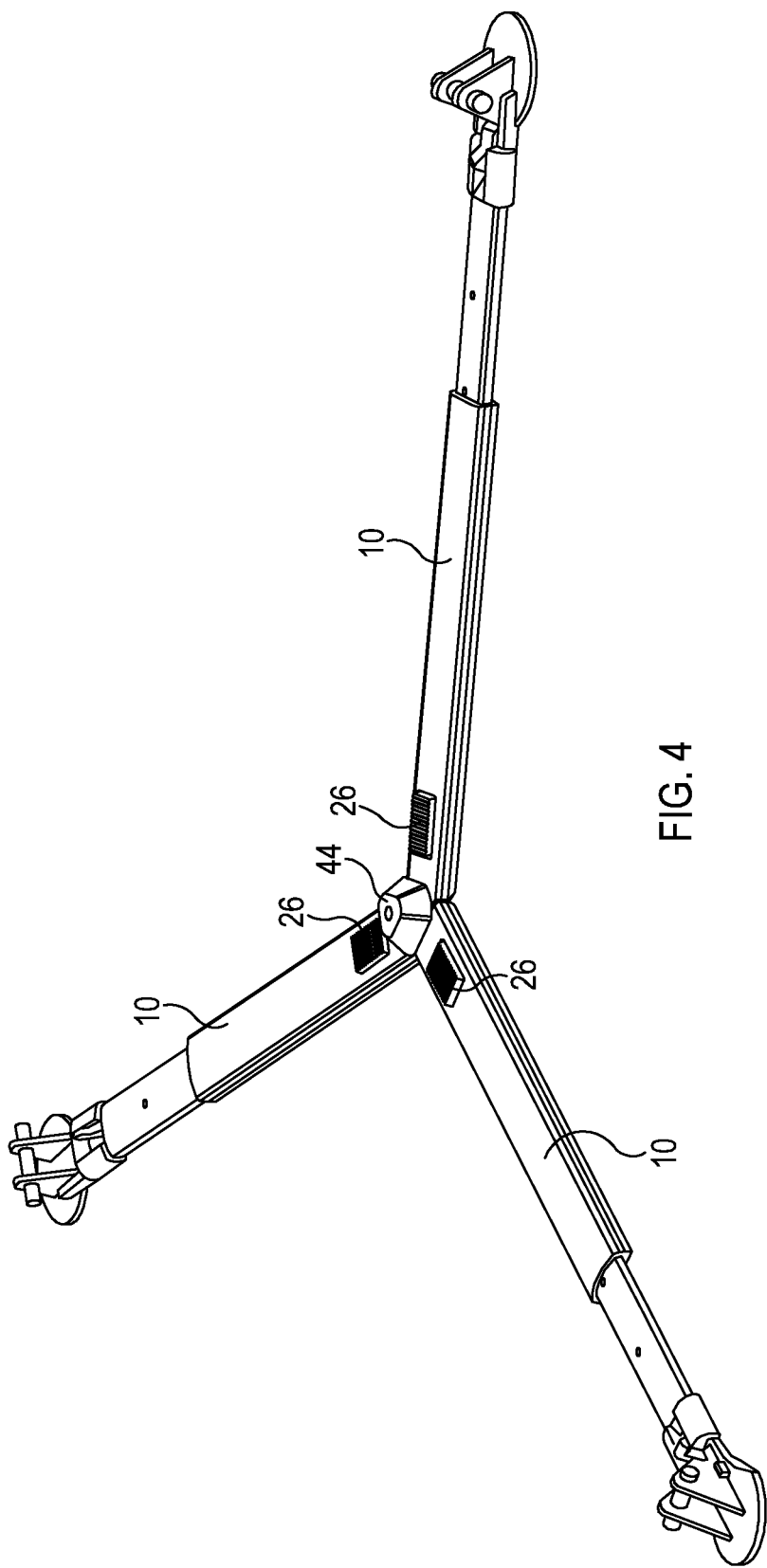
FIG. 4 shows the leg spreaders of FIG. 3 each in a partially extended state.

FIG. 4 shows the same arrangement as FIG. 3, except that the three leg spreaders are in a partially extended state.

Figure 5:
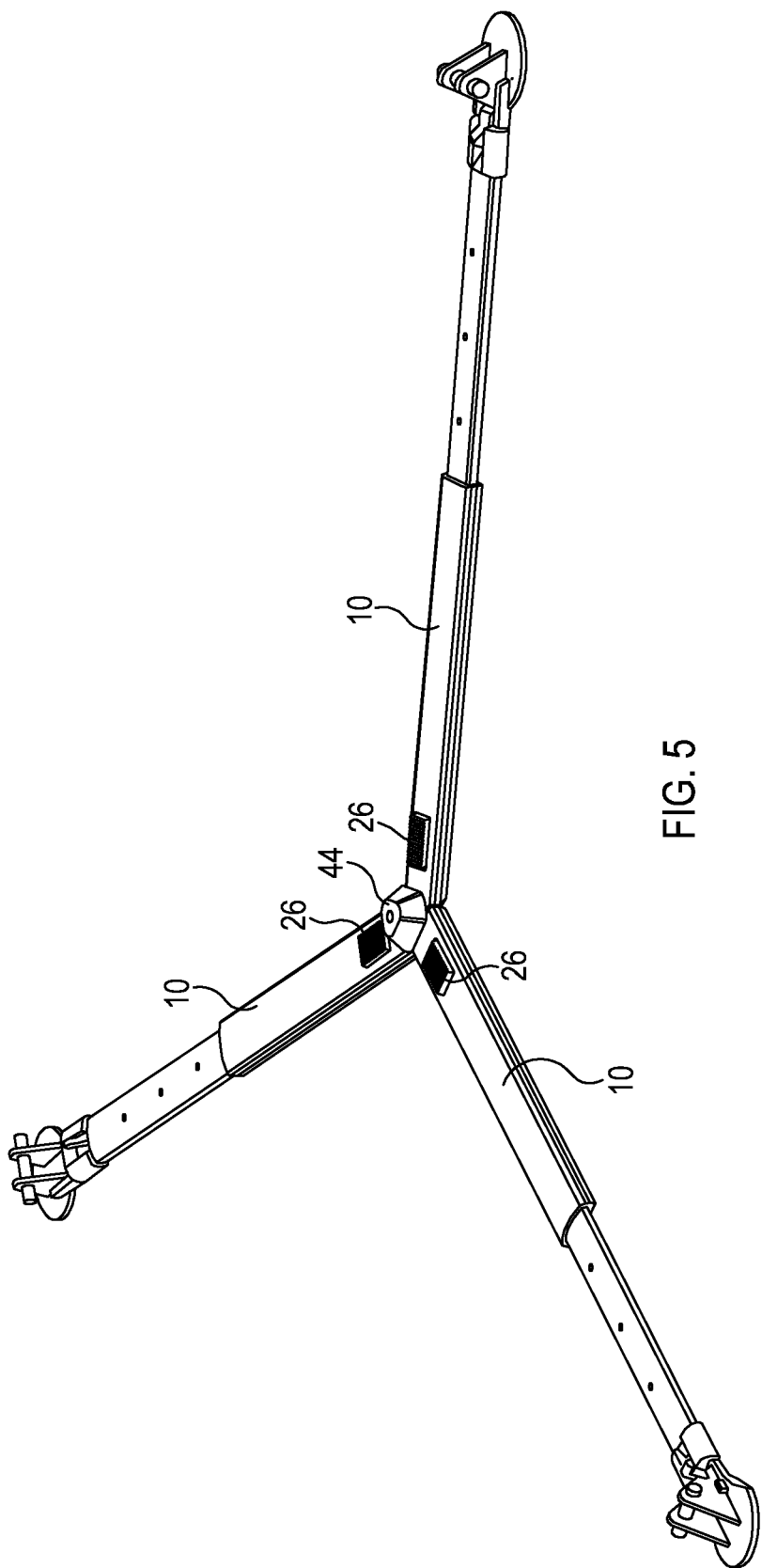
FIG. 5 shows the leg spreaders of FIG. 3 each in an extended state.

FIG. 5 shows the same arrangement as FIGS. 3 and 4, except that the three leg spreaders in a further extended state.

Figure 6:
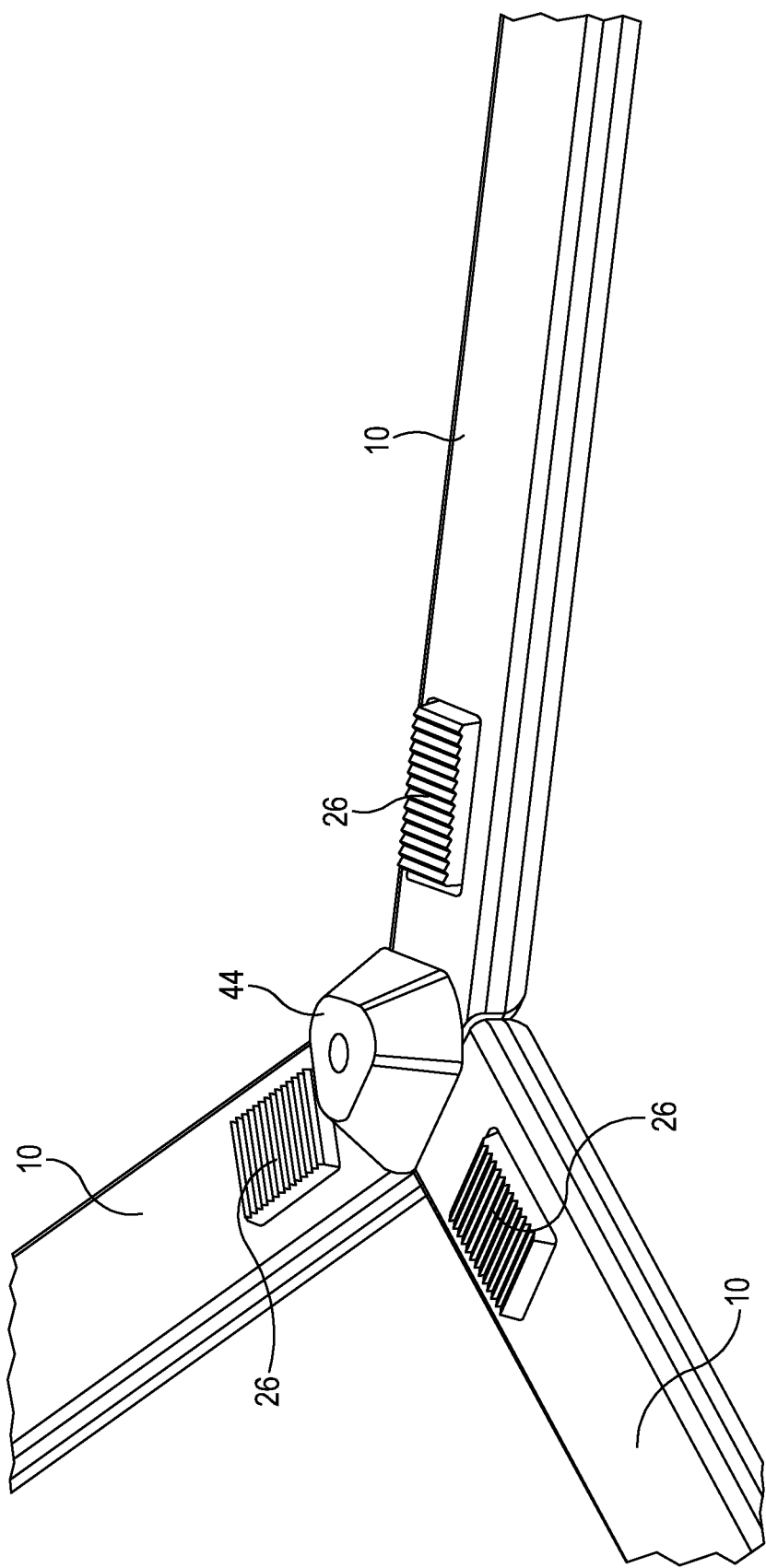
FIG. 6 shows a perspective view of the joint between three leg spreaders having buttons in an initial position.

FIG. 6 shows a more detailed view of the hub 44 which is connected to three leg spreaders 10. The button 26 of each leg spreader 10 is in an initial position where the first and second portions of the leg spreader are non-moveable.

Figure 7:
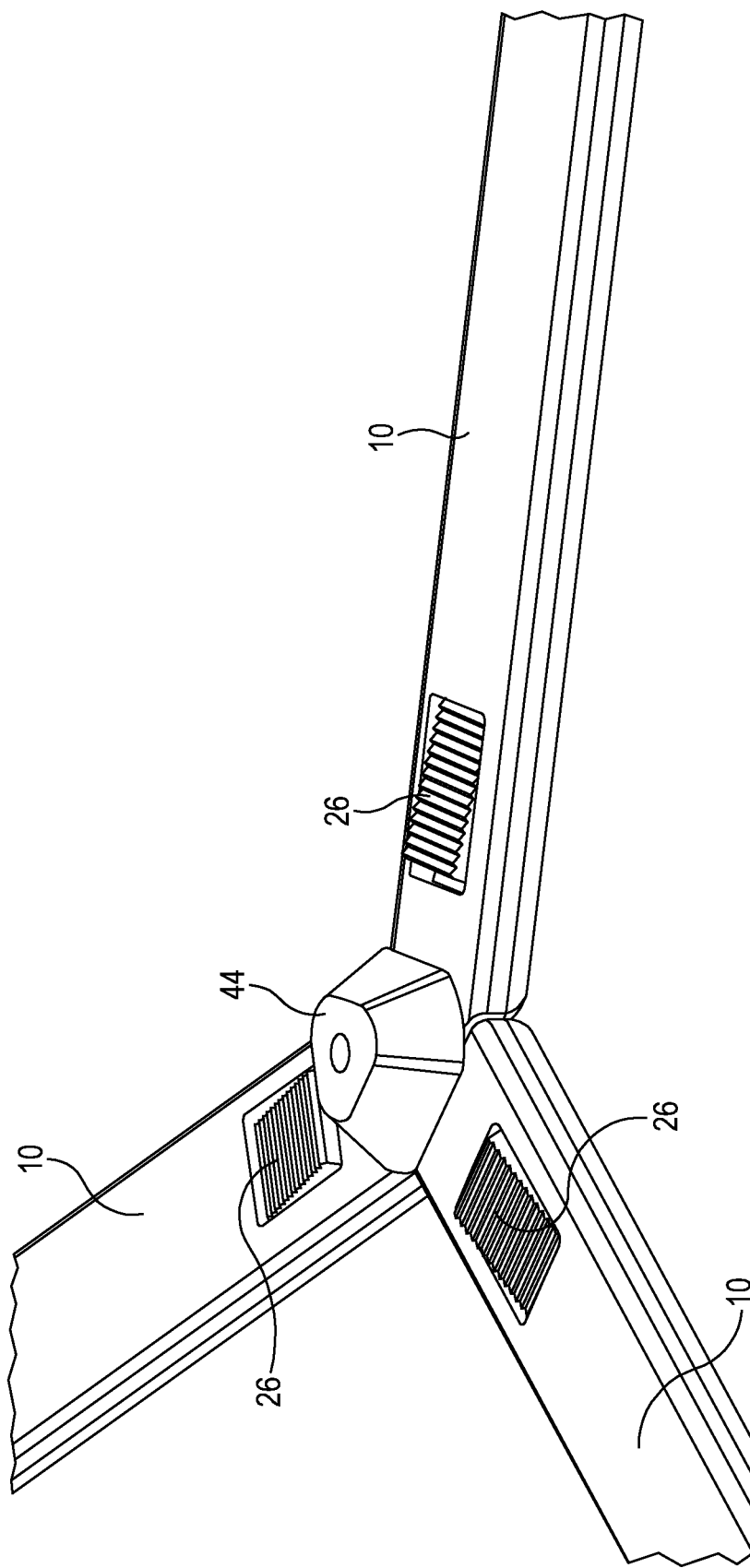
FIG. 7 shows the joint of FIG. 6 with buttons in a final position.

FIG. 7 shows the same arrangement as FIG. 6, except that the button 26 of each leg spreader is in a final position where the first and second portions of the leg spreader are moveable.

Figure 8:
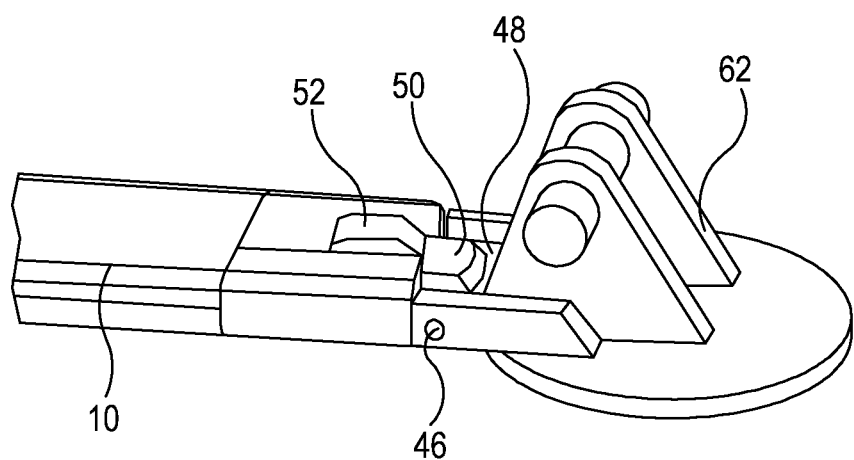
FIG. 8 shows a perspective view of a release mechanism for a tripod and foot of the present inventive concept.

Turning to FIG. 8, a release mechanism for a foot comprises a release bar 46 and a corresponding clasp 48 for engaging the release bar 46. The release bar 46 is connected to the foot 62 and the clasp 48 is connected to the leg spreader 10.

The clasp has a channel (not shown) which is substantially U-shaped, and a closing member 50 which is moveable between an open position and a closed position. The clasp comprises means for biasing the closing member towards the closed position so that when the closing member 50 is in the closed position the channel substantially encloses a portion of the release bar 46. The biasing means is a spring.

The opening of the channel faces upwards in use. A protruding grip 52 provides a surface for a user to apply pressure to open the closing member 50 against the action of the biasing means.

Figure 9:
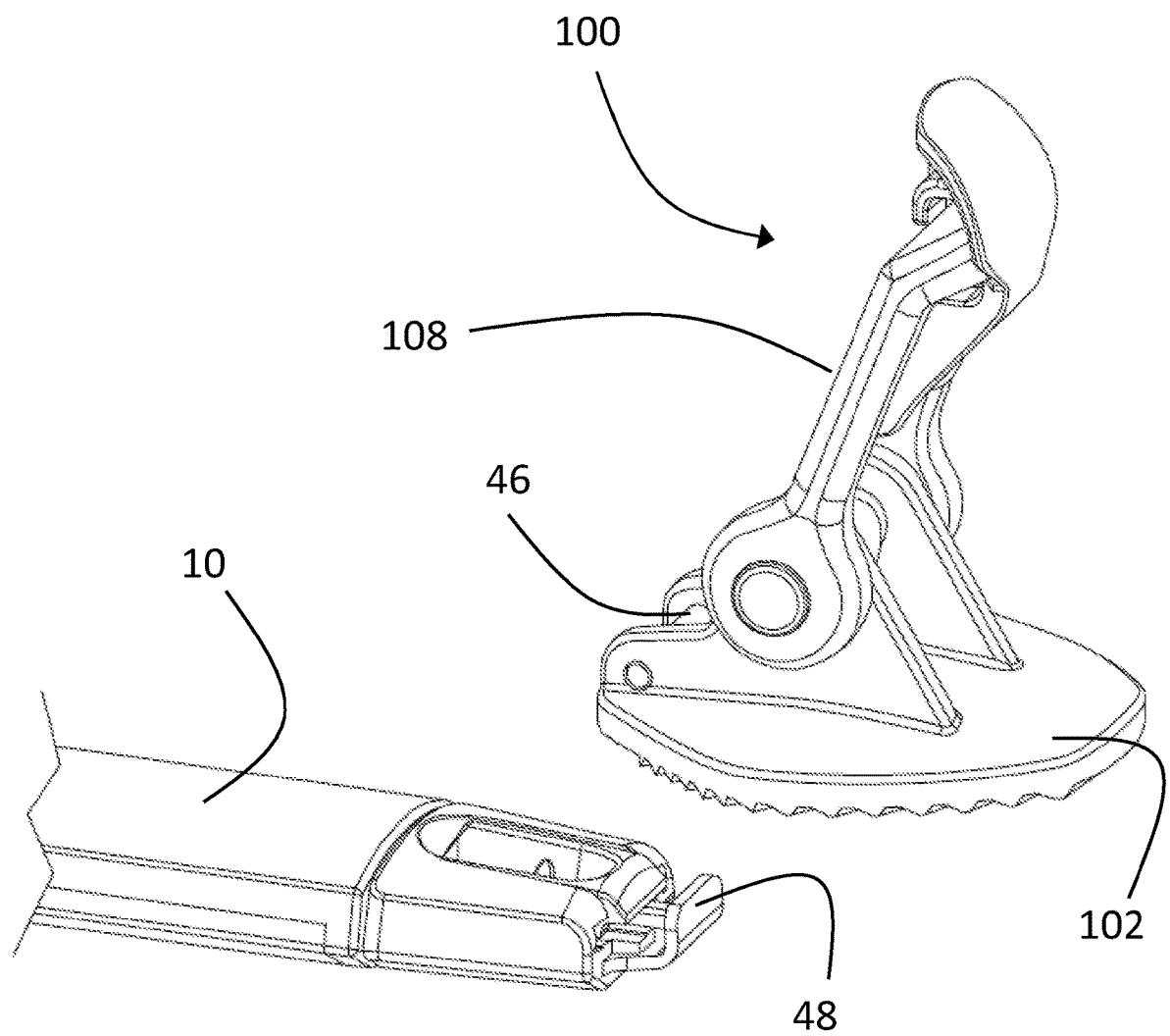
FIG. 9 shows a perspective view of a foot and a portion of a corresponding leg spreader.

FIG. 9 shows a foot 100 having a base portion 102, a release bar 46 which forms a component of a release mechanism and a handle 104. Also shown is a portion of a leg spreader 10 which has a clasp 48 for engaging the release bar 46 in use.

Figure 10:
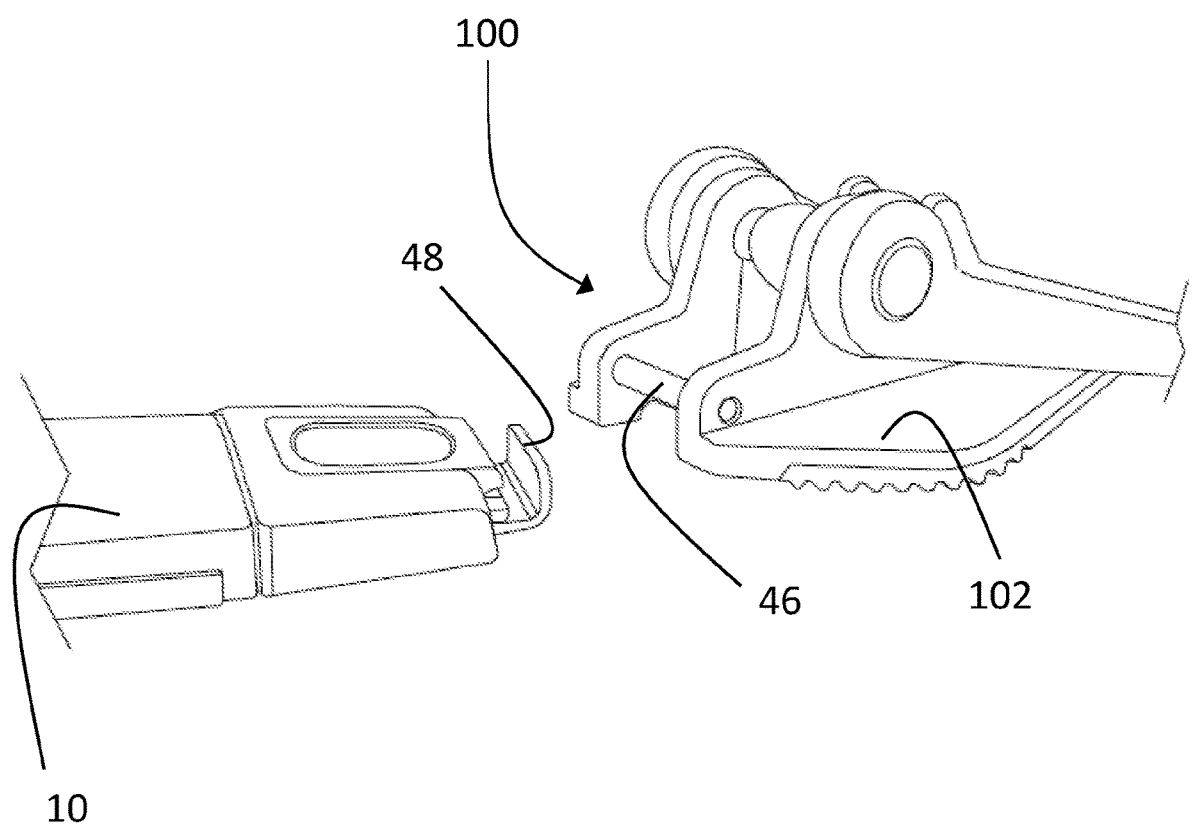
FIG. 10 shows a side perspective view of a foot and a portion of a corresponding leg spreader.

FIG. 10 shows a similar foot 100 having a base portion 102 and a release bar 46 which forms a component of a release mechanism. Also shown is a portion of a leg spreader 10 which has a clasp 48 for engaging the release bar 46 in use.

In use, the foot 10 of FIGS. 9 and 10 can be releasably connected to the leg spreader 10 by the release mechanism formed by the release bar 46 and the clasp 48.

Figure 11:
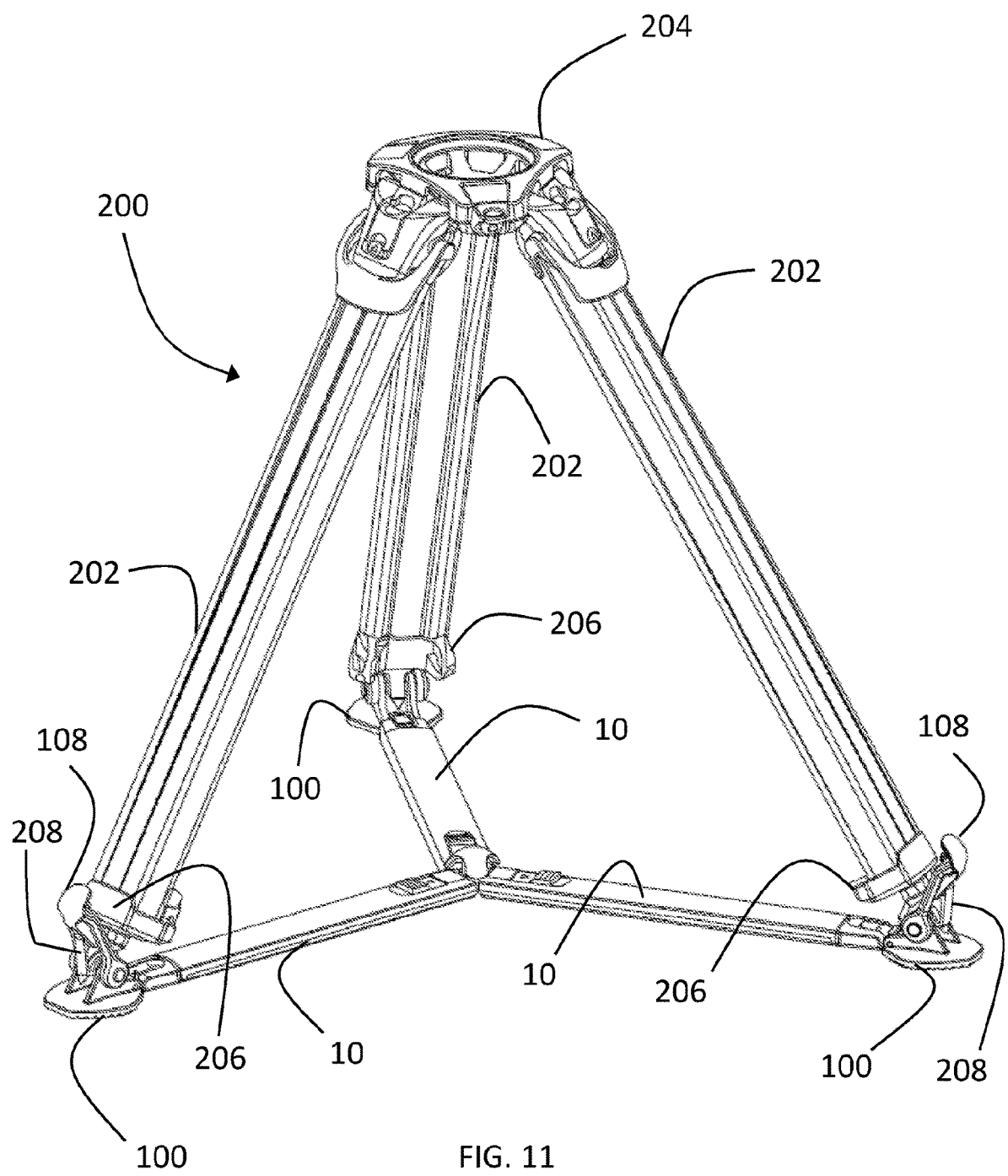
FIG. 11 shows a perspective view of a tripod arrangement incorporating a foot.

FIG. 11 shows a tripod 200 with three legs 202 meeting at a tripod head 204. At the other—lower-end 206 of each leg 202 has a securing recess 208. Handle 104 of each foot 100 is secured in the securing recess 208, so that the foot 100 and the leg 200 are held together in place. Each foot 100 also has a release bar (not shown in FIG. 11) which is engaged by a clasp (not shown in FIG. 11) of a leg spreader 10. This arrangement holds each tripod leg 202 and each leg spreader 10 in place by releasable connection to each foot 100.

The invention claimed is:

1. A leg spreader for a tripod, comprising:
   at least two portions selectably moveable with respect to one another along an axis;
   a first portion comprising a latch; and
   a second portion comprising an engagement region;
   wherein the latch is releasably engageable with the engagement region, and the latch is moveable by an actuator between an engaged position in which the portions are substantially non-moveable with respect to one another and a disengaged position in which the portions are moveable with respect to one another;
   wherein the latch is biased towards the engaged position.

2. A leg spreader in accordance with claim 1, wherein the latch comprises an abutment portion having an abutment surface, and the engagement region comprises a corresponding abutment surface so that the abutment surface of the latch contacts the abutment surface of the engagement region when the actuator is disengaged.

3. A leg spreader in accordance with claim 2, wherein the engagement region comprises a plurality of abutment portions, each abutment portion having at least one abutment surface; the plurality of abutment portions being spaced apart from one another and arranged substantially parallel to the axis of the leg spreader.

4. A leg spreader in accordance with claim 1, wherein the engagement region comprises a plurality of abutment portions, each abutment portion having at least one abutment surface; the plurality of abutment portions being spaced apart from one another and arranged substantially parallel to the axis of the leg spreader.

5. A leg spreader in accordance with claim 4, wherein the engagement region comprises a plurality of crenelations with spaces therebetween; wherein each crenelation has at least two abutment surfaces.

6. A leg spreader in accordance with claim 5, wherein the abutment portion of the latch has an axial length less than or equal to an axial length of the space between adjacent crenelations of the engagement region.

7. A leg spreader in accordance with claim 6, wherein the abutment portion of the latch and the space between adjacent crenelations of the engagement region are correspondingly shaped so that the abutment surfaces thereof match when the latch is in the engaged position.

8. A leg spreader in accordance with claim 5, wherein the abutment portion of the latch and the space between adjacent crenelations of the engagement region are correspondingly shaped so that the abutment surfaces thereof match when the latch is in the engaged position.

9. A leg spreader in accordance with claim 1, wherein the actuator is adapted to be actuated by a pressing force.

10. A leg spreader in accordance with claim 9, wherein the actuator comprises a button pivotally mounted to the first portion of the leg spreader and moveable between an initial position and a final position.

11. A leg spreader in accordance with claim 1, wherein the actuator comprises a button pivotally mounted to the first portion of the leg spreader and moveable between an initial position and a final position.

12. A leg spreader in accordance with claim 11, wherein the actuator further comprises a cable which links the button and the latch; and a spring to bias the latch towards the engaged position.

13. A leg spreader in accordance with claim 12, wherein the button comprises a joint attached to the cable, wherein the joint abuts an inner surface of the first portion; wherein a portion of the joint moves along the inner surface of the first portion, in use, to actuate movement of the cable and the latch.

14. A leg spreader in accordance with claim 13, wherein a region of the inner surface of the first portion which is abutted by the joint comprises a lubricant.

15. A leg spreader in accordance with claim 13, wherein the spring is positioned between two keepers and the spring substantially envelopes a region of the actuator cable.

16. A leg spreader in accordance with claim 12, wherein the spring is positioned between two keepers and the spring substantially envelopes a region of the actuator cable.

17. A leg spreader in accordance with claim 16, wherein the first portion comprises a guide element, and the cable or the spring is at least partially located within the guide element.

18. A leg spreader in accordance with claim 12, wherein the first portion comprises a guide element and the cable and/or the spring is at least partially located within the guide element.

19. A leg spreader in accordance with claim 18, wherein the first portion comprises at least two parts and wherein the latch and the actuator are positioned on an inner surface of one part only.

20. A leg spreader in accordance with claim 1, wherein the first portion comprises at least two parts and wherein the latch and the actuator are positioned on an inner surface of one part only.

* * * * *